US012675362B2

(12) United States Patent
Chang et al.

(10) Patent No.: US 12,675,362 B2
(45) Date of Patent: Jul. 7, 2026

(54) MANAGING STATUS OUTPUT

(71) Applicant: Macronix International Co., Ltd., Hsinchu (TW)

(72) Inventors: Chin-Hung Chang, Tainan (TW); Chia-Jung Chen, Zhubei (TW); Ken-Hui Chen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 129 days.

(21) Appl. No.: 18/191,401

(22) Filed: Mar. 28, 2023

(65) Prior Publication Data

US 2024/0184668 A1 Jun. 6, 2024

Related U.S. Application Data

(60) Provisional application No. 63/430,357, filed on Dec. 6, 2022.

(51) Int. Cl.
G06F 11/00 (2006.01)
G06F 11/10 (2006.01)

(52) U.S. Cl.
CPC .................................. G06F 11/1044 (2013.01)

(58) Field of Classification Search
None
See application file for complete search history.

(56) References Cited

U.S. PATENT DOCUMENTS

| | | | | |
|---|---|---|---|---|
| 7,730,307 B2 * | 6/2010 | Viggiano | .............. | H04L 9/3271 |
| | | | | 713/168 |
| 9,496,897 B1 * | 11/2016 | Triandopoulos | .... | H04L 63/0435 |
| 10,621,336 B2 * | 4/2020 | Xing | ....................... | G06F 21/53 |
| 10,789,019 B2 | 9/2020 | Kim et al. | | |
| 2011/0093947 A1 * | 4/2011 | Kato | ....................... | H04L 63/20 |
| | | | | 726/16 |
| 2011/0141953 A1 * | 6/2011 | Wright | .................. | H04W 12/35 |
| | | | | 370/310 |
| 2012/0155349 A1 * | 6/2012 | Bajic | ..................... | H04L 69/329 |
| | | | | 370/310 |
| 2016/0293274 A1 * | 10/2016 | Schuh | .................... | G11C 29/16 |
| 2018/0091308 A1 * | 3/2018 | Durham | ................ | H04L 9/3242 |
| 2018/0145921 A1 * | 5/2018 | Gupta | ..................... | H04L 67/04 |
| 2019/0042796 A1 * | 2/2019 | Von Bokern | ........ | G06F 9/45558 |
| 2020/0314491 A1 * | 10/2020 | Rodgers | ................ | H04L 43/028 |
| 2021/0083687 A1 * | 3/2021 | Lee | ....................... | H03M 13/116 |

(Continued)

FOREIGN PATENT DOCUMENTS

| | | |
|---|---|---|
| CN | 113805815 | 12/2021 |
| CN | 115408193 | 11/2022 |

(Continued)

*Primary Examiner* — Mujtaba M Chaudry
(74) *Attorney, Agent, or Firm* — Fish & Richardson P.C.

(57) ABSTRACT

Systems, devices, methods, and circuits for managing status output are provided. In one aspect, a semiconductor device includes: a memory array configured to store data and a circuitry coupled to the memory array and configured to execute a read operation in the memory array and output a read packet based on a result of the execution of the read operation. The read packet includes readout data and error information associated with the readout data. The error information is indicated by at least one of an error code or one or more secure codes in the read packet.

18 Claims, 5 Drawing Sheets

(56) References Cited

U.S. PATENT DOCUMENTS

| | | | | |
|---|---|---|---|---|
| 2021/0091952 A1* | 3/2021 | Wentz | ................... | H04L 9/0866 |
| 2021/0097528 A1* | 4/2021 | Wang | ........................ | H04L 9/30 |
| 2022/0123940 A1* | 4/2022 | Bennett | ................... | G06F 21/64 |

FOREIGN PATENT DOCUMENTS

| | | |
|---|---|---|
| TW | 202203034 | 1/2022 |
| TW | 202219765 | 5/2022 |

* cited by examiner

300

Request Packet:

Packet In Write Sequence (PKTI+ADDR+DATA)

| Frame | | | DATA | | | | | | |
|---|---|---|---|---|---|---|---|---|---|
| | PKTI | ADDR | | | | Packet | | | |
| | | | CMD Code | Option | Variable 1 | Variable 2 | InDATA | InMAC | CRC |
| Data/Code | 2Eh | 7FFE00h (Fixed code) | Count | | | | | | |
| Length | 1 Byte | 3 Bytes | 3 Bytes | 1 Byte | 1 Byte | 4 Bytes | 4 Bytes | n Bytes | 0/16/32 Bytes | 2 Bytes |

Read Packet (Data Output from device):

Packet Out Read Sequence (PKO+ADDR+DATA)

| Frame | PKO | ADDR | Dummy | | | DATA | | | |
|---|---|---|---|---|---|---|---|---|---|
| | | | | Error Code | Count | OutDATA | OutMAC | CRC |
| Data/Code | 2Ah | 7FFE00h (Fixed code) | Hi-Z | | | | | | |
| Length | 1 Byte | 3 Byte | configurable | 1 Byte | 3 Byte | n Byte | 0/16/32 Byte | 2 Byte |

332    334    336    338

First portion 334a    Second portion 334b

Read Packet (Data Output from device):

Packet Out Read Sequence (PKO+ADDR+DATA)

| Frame | PKO | ADDR | Dummy | | | DATA | | | |
|---|---|---|---|---|---|---|---|---|---|
| | | | | Error Code | Count | OutDATA | OutMAC | CRC |
| Data/Code | 2Ah | 7FFE00h (Fixed code) | Hi-Z | | | | | | |
| Length | 1 Byte | 3 Byte | configurable | 1 Byte | 3 Byte | n Byte | 0/16/32 Byte | 2 Byte |

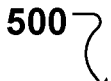
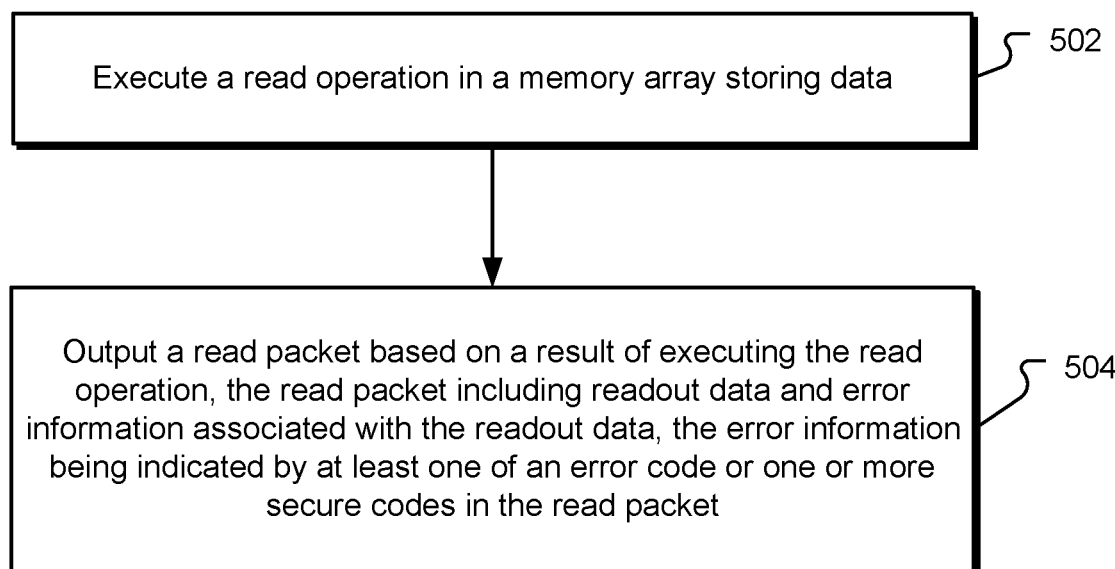
Execute a read operation in a memory array storing data 502
Output a read packet based on a result of executing the read operation, the read packet including readout data and error information associated with the readout data, the error information being indicated by at least one of an error code or one or more secure codes in the read packet 504
FIG. 5

MANAGING STATUS OUTPUT

CROSS-REFERENCE TO RELATED APPLICATION

This application claims priority under 35 USC § 119(e) to U.S. Provisional Patent Application Ser. No. 63/430,357, entitled "SECURE STATUS OUTPUT" and filed on Dec. 6, 2022, the entire content of which is hereby incorporated by reference.

BACKGROUND

Non-volatile memory devices are used in electronic systems to store data in a nonvolatile manner. During use, the memory devices output status of operations executed in the memory devices.

SUMMARY

The present disclosure describes methods, devices, systems, and techniques for managing status (e.g., error information) output (e.g., for a secure operation) in a semiconductor device, e.g., a non-volatile memory device such as NOR flash memory device.

One aspect of the present disclosure features a semiconductor device including: a memory array configured to store data; and a circuitry coupled to the memory array and configured to execute a read operation in the memory array and output a read packet based on a result of the execution of the read operation in the memory array. The read packet includes readout data and error information associated with the readout data, and where the error information is indicated by at least one of an error code or one or more secure codes in the read packet.

In some embodiments, the error information indicates whether there is error occurrence on the readout data.

In some embodiments, the read operation is a secure read operation with error detection and correction using error correction code (ECC).

In some embodiments, the circuitry is configured to sequentially output the error code, the readout data, and the one or more secure codes in the read packet.

In some embodiments, the error code indicates that there is no error associated with the readout data, and the one or more secure codes indicate that there is an error associated with the readout data.

In some embodiments, where the one or more secure codes include at least one of a secure data code based on the readout data or a secure packet code based on the read packet.

In some embodiments, the circuitry is configured to: generate a message authentication code (MAC) of the readout data; and change the MAC to obtain the secure data code that is different from the MAC.

In some embodiments, the circuitry is configured to generate the MAC of the readout data by a cryptographic algorithm. The cryptographic algorithm can include an Advanced Encryption Standard (AES) algorithm including AES-GCM (Galois/Counter Mode) or AES-CCM (Counter with Cipher Block Chaining-Message Authentication Code). The MAC can include Galois Message Authentication Code (GMAC).

In some embodiments, the circuitry is configured to change the MAC to obtain the secure data code by inverting the MAC with a logic, and the logic includes at least one of an inverter or a XOR logic gate.

In some embodiments, the circuitry is configured to: generate a cyclic redundancy check (CRC) of the read packet; and change the CRC to obtain the secure packet code that is different from the CRC.

In some embodiments, the circuitry is configured to change the CRC to obtain the secure packet code by inverting the CRC with a logic, and the logic includes at least one of an inverter or a XOR logic gate.

In some embodiments, the circuitry is configured to generate the CRC of the read packet by a CRC calculation or algorithm.

In some embodiments, the circuitry is configured to output the error information after the readout data.

In some embodiments, the circuitry is configured to sequentially output the readout data, MAC of the readout data, the error code, and CRC of the read packet in the read packet, and the error information is indicated by the error code.

In some embodiments, there is no indication of error information in the MAC and in the CRC.

In some embodiments, the error information is further indicated by the CRC.

In some embodiments, the circuitry is configured to: generate an initial CRC of the read packet; and change the initial CRC to obtain the CRC that is different from the initial CRC.

In some embodiments, the circuitry is configured to: generate the error information in response to detecting a failure of error correction on at least a portion of the readout data.

In some embodiments, the readout data includes a first portion of the readout data output concurrently with the error code and a second portion of the readout data output after the error code, and the failure of error correction is on the second portion of the readout data.

In some embodiments, the circuitry is configured to: execute the read operation based on a request packet, where the request packet includes information specifying the read operation.

Another aspect of the present disclosure features a system, including: a semiconductor device and a controller. The semiconductor device includes: a memory array configured to store data; and a circuitry coupled to the memory array and configured to execute a read operation in the memory array and output a read packet based on a result of the execution of the read operation, where the read packet includes readout data and error information associated with the readout data, and where the error information is indicated by at least one of an error code or one or more secure codes in the read packet. The controller is coupled to the semiconductor device and configured to receive the read packet from the semiconductor device. The controller is configured to detect the error information associated with the readout data based on the at least one of the error code or the one or more secure codes in the read packet.

In some embodiments, the controller is configured to: receive the error code before the readout data and the one or more secure codes in the read packet; and detect the error information associated with the readout data based on the one or more secure codes in the read packet.

In some embodiments, the one or more secure codes include a secure data code based on the readout data, and the controller is configured to: generate MAC of the readout data received in the read packet, compare the generated MAC with the secure data code received in the read packet to determine whether the generated MAC is different from the secure data code received in the read packet, and determine that there is an error associated with the readout data received in the read packet if the generated MAC is different from the secure data code received in the read packet.

In some embodiments, the one or more secure codes include a secure packet code based on the read packet, and the controller is configured to: generate CRC of the read packet, compare the generated CRC with the secure packet code received in the read packet to determine whether the generated CRC is different from the secure packet code received in the read packet, and determine that there is an error associated with the readout data received in the read packet if the generated CRC is different from the secure packet code received in the read packet.

In some embodiments, the controller is configured to: receive the error code after the readout data, and detect error information associated with the readout data based on the error code.

In some embodiments, the controller is configured to send a request packet to the semiconductor device, where the request packet includes information specifying the read operation.

A further aspect of the present disclosure features a method including: executing a read operation in a memory array storing data; and outputting a read packet based on a result of executing the read operation. The read packet includes readout data and error information associated with the readout data, and where the error information is indicated by at least one of an error code or one or more secure codes in the read packet.

Note that in the present disclosure, the term "secure operation" represents an operation securely performed in a semiconductor device. The secure operation can be associated with a security procedure, e.g., authentication and/or verification of data, message, or any control information related to the operation. The secure operation can include a secure read operation, a secure write operation, a secure key generation, verification or update, or any other type of operation. The term "secure data" represents data that can be encrypted or authenticated using a cryptographic (or secret) key and/or using any suitable authentication or encryption algorithm, function, or scheme. The term "secure code" represents a code that can be generated, authenticated, and/or verified using an authentication and/or verification algorithm, function, or scheme. The secure code can be a message authentication code (MAC) or a cyclic redundancy check (CRC). The term "secure memory device" represents a memory device that can include encryption, decryption, authentication, and/or verification features. For example, a secure memory device can encrypt and/or decrypt data, and/or verify (or check) an authentication code from a controller to authenticate the controller.

Implementations of the above techniques include methods, systems, circuits, computer program products and computer-readable media. In one example, a method can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 3A illustrates an example of a request packet for a secure operation, according to one or more embodiments of the present disclosure.

FIG. 3B illustrates an example of a read packet for a secure operation, according to one or more embodiments of the present disclosure.

FIG. 3C illustrates another example of a read packet for a secure operation, according to one or more embodiments of the present disclosure.

FIG. 5 is a flow chart of an example of a process for managing status output in a semiconductor device, according to one or more embodiments of the present disclosure.

Like reference numbers and designations in the various drawings indicate like elements. It is also to be understood that the various exemplary implementations shown in the figures are merely illustrative representations and are not necessarily drawn to scale.

DETAILED DESCRIPTION

Figures 1A, 1B:
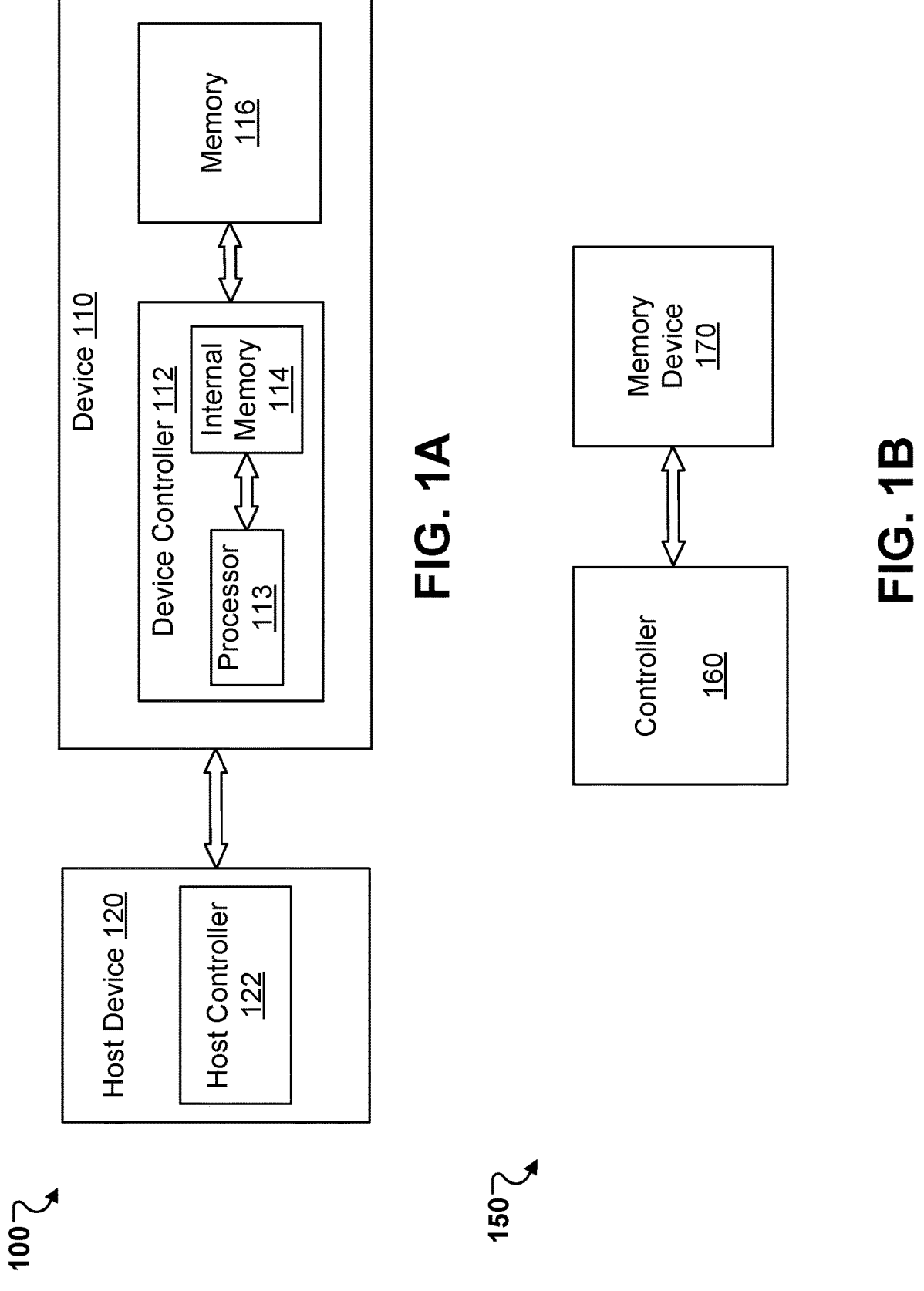
FIG. 1A is a schematic diagram illustrating an example of a system, according to one or more embodiments of the present disclosure.
FIG. 1B is a schematic diagram illustrating another example of a system including a controller and a memory device, according to one or more embodiments of the present disclosure.

Implementations of the present disclosure provide techniques for managing status output in semiconductor devices, e.g., non-volatile memory devices such as NOR flash memory devices, which can accurately report error information of secure operations (e.g., secure read operations with ECC capability) executed in the semiconductor devices.

In some implementations, a semiconductor device includes a memory array configured to store data (e.g., critical data or secure data), and a circuitry coupled to the memory array. The circuitry can be configured to execute a read operation (e.g., a secure read operation) to read out stored data in the memory array and output a read packet based on a result of the execution of the read operation in the memory array. The read packet can include different types of data (or information) including: error code associated with the read operation, readout data, a message authentication code (MAC) of the readout data, and/or a cyclic redundancy check (CRC) of the read packet. The circuitry can sequentially output the different types of data in the read packet in any suitable order. Error information associated with the read operation or the readout data can be indicated by at least one of the error code, the MAC, or the CRC.

In some cases, the error code is arranged to be output before the readout data. If the error code does not indicate any error for the read operation, the readout data is output following the error code. However, there may be an error occurrence (or an occurrence of error) on the readout data output at a later time than the error code. The circuitry can change (e.g., invert) an original MAC of the readout data internally and/or change (e.g., invert) an original CRC of the read packet internally to indicate the error occurrence on the readout data.

In some cases, the error code is arranged to be output after the readout data and the MAC. The error code can be used to indicate error occurrence on the readout data. For example, the circuitry can set a value for the error code in response to determining that the ECC cannot correct at least a portion of the readout data. The value can specify the level or degree of ECC uncorrectability on the readout data. The CRC is output after the error code, and can be changed (e.g., inverted) to indicate the error occurrence on the readout data.

The techniques disclosed herein provide an error information reporting scheme for operations (e.g., secure operations such as secure read operations) in semiconductor devices. For illustration purposes, a memory device is described herein as an example of a semiconductor device. It is noted that the techniques can be implemented for any type of circuits, devices, or systems that need error reporting. For example, besides memory devices, the techniques can be also applied to any other storage devices or logic devices such as microprocessors or controllers.

The techniques can be applied to various types of non-volatile memory devices such as NOR flash memory devices, NAND flash memory devices, erasable programmable read-only memory (EPROM), Ferroelectric Random Access Memory (FeRAM), Magnetoresistive random-access memory (MRAM), among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (cMMC), or solid-state drives (SSDs), embedded systems, or computing network devices such as network routers or network processors, cache controllers and translation lookaside buffers, lookup tables, database engines, data compression hardware, artificial neural networks, intrusion prevention systems, custom computer, among others.

FIG. 1A is a schematic diagram illustrating an example of a system 100, according to one or more embodiments of the present disclosure. The system 100 includes a device 110 and a host device 120. The device 110 includes a device controller 112 and a memory 116. The device controller 112 includes a processor 113 and an internal memory 114. In some implementations, the device 110 includes a plurality of memories 116 that are coupled to the device controller 112. The memory 116 includes a plurality of blocks. The memory 116 can be a two-dimensional (2D) memory including 2D memory blocks. The memory 116 can also be a three-dimensional (3D) memory including 3D memory blocks.

The host device 120 includes a host controller 122 that can include at least one processor and at least one memory coupled to the at least one processor and storing programming instructions for execution by the at least one processor to perform one or more corresponding operations.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller.

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory 114 is a cache memory that is included in the device controller 112, as shown in FIG. 1A. The internal memory 114 stores instruction codes, which correspond to the instructions executed by the processor 113, and/or the data that are requested by the processor 113 during runtime. The device controller 112 transfers the instruction code and/or the data from the memory 116 to the internal memory 114.

In some implementations, the memory 116 is a non-volatile memory that is configured for long-term storage of instructions and/or data, e.g., an NAND or NOR flash memory device, or some other suitable non-volatile memory device. The memory 116 can include one or more memory chips. In implementations where the memory 116 is an NAND flash memory, the device 110 is a flash memory device, e.g., a flash memory card, and the device controller 112 is an NAND flash controller. For example, in some implementations, when the device 110 is an eMMC or an SD card, the memory 116 is an NAND flash memory; in some implementations, when the device 110 is a digital camera, the memory 116 is an SD card; and in some implementations, when the device 110 is a media player, the memory 116 is a hard disk. In some implementations where the memory 116 is an NOR flash memory, the device 110 can optionally include the device controller 112. In some cases, the device 110 can include no device controller and the memory 116 can directly communicate with the host device 120.

FIG. 1B is a schematic diagram illustrating another example of a system 150 including a controller 160 and a memory device 170, according to one or more embodiments of the present disclosure. The controller 160 is coupled to the memory device 170 via an electrical connection, e.g., an electrical wire, pin or bus, or a wireless connection, and communicates, e.g., directly, with the memory device 170. The controller 160 can be the host controller 122 of FIG. 1A or the device controller 112 of FIG. 1A. The memory device 170 can be the memory 116 of FIG. 1A and can be implemented as a non-volatile memory device.

Figure 2:
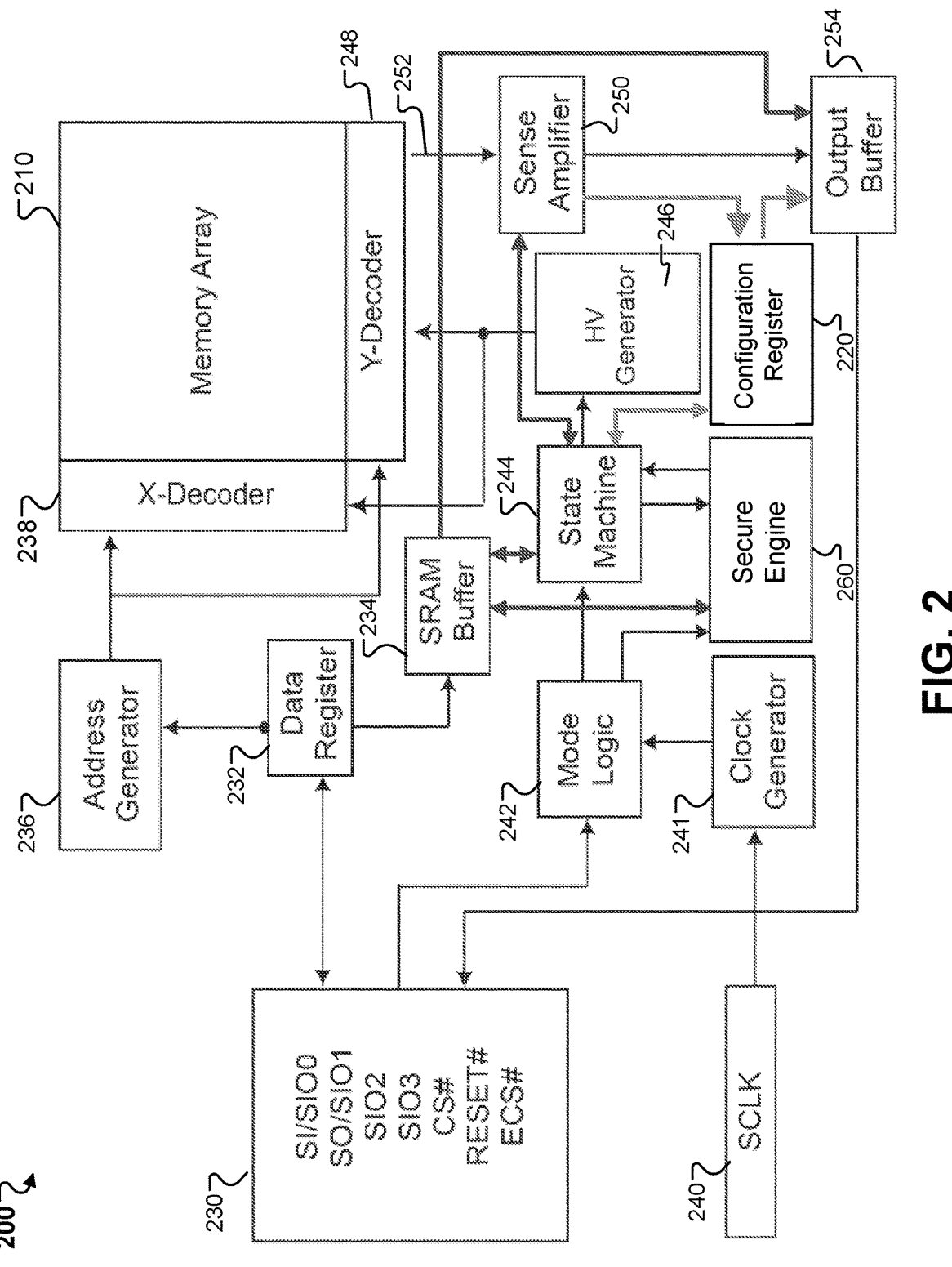
FIG. 2 is a schematic diagram illustrating an example of a memory device, according to one or more embodiments of the present disclosure.

FIG. 2 is a schematic diagram illustrating an example of a memory device 200, according to one or more embodiments of the present disclosure. The memory device 200 can be the memory 116 of FIG. 1A or the memory device 170 of FIG. 1B. The memory device 200 can be a non-volatile memory device (e.g., a NOR flash memory). The memory device 200 can be implemented as a secure memory device configured to perform one or more secure operations, e.g., secure read, secure write, and/or key generation.

The memory device 200 can be configured to use an error correction code (ECC) to detect and correct data corruption that occurs in the memory device 200. In some implementations, the memory device 200 has ECC capability, e.g., including an ECC module configured to perform error detection and correction.

As illustrated in FIG. 2, the memory device 200 includes a number of components that can be integrated onto a board, e.g., a Si-based carrier board, and be packaged. The memory device 200 can have a memory array (or a memory cell array) 210 that can include a number of memory cells. The memory cells can be coupled in series to a number of row word lines and a number of column bit lines. Each memory cell can include at least one memory transistor configured as a storage element to store data. The memory transistor can include a silicon-oxide-nitride-oxide-silicon (SONOS) transistor, a floating gate transistor, a nitride read only memory (NROM) transistor, or any suitable non-volatile memory MOS device that can store charges.

In some implementations, the memory device 200 includes one or more memory chips each storing a corresponding memory array. A data memory chip can include a larger memory array (e.g., the memory array 210) for storing data, while a configuration memory chip can include a smaller memory array for storing configuration information.

The memory device 200 can include an X-decoder (or row decoder) 238 and optionally a Y-decoder (or column decoder) 248. Each memory cell can be coupled to the X-decoder 238 via a respective word line and coupled to the Y-decoder 248 via a respective bit line. Accordingly, each memory cell can be selected by the X-decoder 238 and the Y-decoder 248 for read or write operations through the respective word line and the respective bit line.

The memory device 200 can include a memory interface (input/output—I/O) 230 having multiple pins configured to be coupled to an external device, e.g., the device controller 112 and/or the host device 120 of FIG. 1A or the controller 160 of FIG. 1B. The memory interface 230 can be configured to support one or more types (e.g., communication protocols with the controller) and interface instructions. The memory interface 230 can be a Serial Peripheral Interface (SPI), Octal SPI (OPI), or any other suitable interface.

In some embodiments, the pins in the memory interface 230 can include SI/SIO0 for serial data input/serial data input & output, SO/SIO1 for serial data output/serial data input &output, SIO2 for serial data input or output, SIO3 for serial data input or output, CS# for chip select, and RESET# for hardware reset pin active low. The memory interface 230 can also include ECS# for hardware pin configured to independently report memory ECC error or failure, e.g., without a command from a controller. The memory interface 230 can also include one or more other pins, e.g., WP# for write protection active low, and/or Hold# for a holding signal input.

The memory device 200 can include a data register 232, an SRAM buffer 234, an address generator 236, a synchronous clock (SCLK) input 240, a clock generator 241, a mode logic 242, a state machine 244, and a high voltage (HV) generator 246. The SCLK input 240 can be configured to receive a synchronous clock input and the clock generator 241 can be configured to generate a clock signal for the memory device 200 based on the synchronous clock input. The mode logic 242 can be configured to determine whether there is a read or write operation and provide a result of the determination to the state machine 244.

The memory device 200 can also include a sense amplifier 250 that can be optionally connected to the Y-decoder 248 by a data line 252 and an output buffer 254 for buffering an output signal from the sense amplifier 250 to the memory interface 230. The sense amplifier 250 can be part of a read circuitry that is used when data is read from the memory device 200. The sense amplifier 250 can be configured to sense low power signals from a bit line that represents a data bit (1 or 0) stored in a memory cell and to amplify small voltage swings to recognizable logic levels so the data can be interpreted properly. The sense amplifier 250 can also communicate with the state machine 244, e.g., bidirectionally.

A controller, e.g., the host controller 122 or the device controller 112 of FIG. 1A or the controller 160 of FIG. 1B, can generate commands, such as read commands and/or write commands that can be executed respectively to read data from and/or write data to the memory device 200. Data being written to or read from the memory array 210 can be communicated or transmitted between the memory device 200 and the controller and/or other components via a data bus (e.g., a system bus), which can be a multi-bit bus.

In some examples, during a read operation, the memory device 200 receives a read command from the controller through the memory interface 230. The state machine 244 can provide control signals to the HV generator 246 and the sense amplifier 250. The sense amplifier 250 can also send information, e.g., sensed logic levels of data, back to the state machine 244. The HV generator 246 can provide a voltage to the X-decoder 238 and the Y-decoder 248 for selecting a memory cell. The sense amplifier 250 can sense a small power (voltage or current) signal from a bit line that represents a data bit (1 or 0) stored in the selected memory cell and amplify the small power signal swing to recognizable logic levels so the data bit can be interpreted properly by logic outside the memory device 200. The output buffer 254 can receive the amplified voltage from the sense amplifier 250 and output the amplified power signal to the logic outside the memory device 200 through the memory interface 230.

In some examples, during a write operation, the memory device 200 receives a write command from the controller. The data register 232 can register input data from the memory interface 230, and the address generator 236 can generate corresponding physical addresses to store the input data in specified memory cells of the memory array 210. The address generator 236 can be connected to the X-decoder 238 and Y-decoder 248 that are controlled to select the specified memory cells through corresponding word lines and bit lines. The SRAM buffer 234 can retain the input data from the data register 232 in its memory as long as power is being supplied. The state machine 244 can process a write signal from the SRAM buffer 234 and provide a control signal to the HV generator 246 that can generate a write voltage and provide the write voltage to the X-decoder 238 and the Y-decoder 248. The Y-decoder 248 can be configured to output the write voltage to the bit lines for storing the input data in the specified memory cells. The state machine 244 can also provide information, e.g., state data, to the SRAM buffer 234. The SRAM buffer 234 can communicate with the output buffer 254, e.g., sending information or data out to the output buffer 254.

In some implementations, as illustrated in FIG. 2, the memory device 200 includes a secure engine 260 configured for performing one or more secure operations in the memory device 200. The secure engine 260 can be coupled to one or more components in the memory device 200, e.g., the SRAM buffer 234, the mode logic 242, and/or the state machine 244. The secure engine 260 can communicate, e.g., bidirectionally, with at least one of the SRAM buffer 234, the mode logic 242, or the state machine 224. In some implementations, the SRAM buffer 234 can input secure information (e.g., authentication data) to the secure engine 260. The mode logic 242 can decode a packet command (e.g., a request packet) from the controller for the secure engine 260. The state machine 244 can activate the secure engine 260, e.g., in response to receiving a secure read command from the controller, and/or check the secure engine 260 whether an authentication of the controller fails or succeeds.

In some implementations, during a secure write operation, the secure engine 260 can be configured to: i) decrypt information (e.g., write command, option code, addresses, and data) using a cryptographic key, ii) generate an authentication code to verify authentication information from the controller and authenticate the controller, and/or iii) perform secure writing data to one or more addresses in the memory array 210.

In some implementations, as discussed with further details below, during a secure read operation to read data from one or more addresses in the memory array 210 (e.g., in response to receiving a read command from a controller), the secure engine 260 can be configured to: encrypt readout data using a cryptographic key and generate an authentication code (e.g., MAC) of the readout data. The authentication code can be output together with the readout data to the controller. The secure engine 260 can also generate a cyclic redundancy check (CRC) for a read packet (or output packet) using a CRC calculation or algorithm. CRC can be used for detecting errors in transmitted information (data or message) in the read packet. The CRC can be appended to the transmitted information, e.g., at an end of the read packet.

In some implementations, the secure engine 260 includes one or more modules, including a cryptographic (crypto) module, a CRC generation module, an authentication module, a secure write module, and/or a secure read module. Each module can include one or more logic circuits and/or registers configured to implement an algorithm or an operation. In some implementations, the controller coupled to the memory device 200 includes one or more corresponding modules, e.g., a crypto module, a CRC generation module, and/or an authentication module.

The crypto module can be configured to decrypt, using a cryptographic algorithm, encrypted information and/or authentication information (e.g., received from a controller). The crypto module can be also configured to encrypt, using the cryptographic algorithm, information (e.g., readout data or data in a read packet). The cryptographic algorithm can be an authenticated encryption algorithm designed to provide both authentication and confidentiality. In some examples, the cryptographic algorithm is an Advanced Encryption Standard (AES) algorithm, e.g., Advanced Encryption Standard Galois Counter Mode (AES-GCM), or Advanced Encryption Standard-Counter with Cipher Block Chaining-Message Authentication Code (AES-CCM).

The CRC generation module can be configured to perform CRC calculation on data or message in the output packet or read packet. The CRC calculation can be implemented with CRC-16 polynomial, CRC-CCITT (Consultative Committee for International Telephony and Telegraphy), CRC-32 or other polynomials. The authentication module can be configured to authenticate the controller based on a result of comparing an authentication code generated by the crypto module with an input authentication code from the controller. The secure write module can be configured to execute a secure write operation, e.g., in response to determining that the controller is authenticated, in the memory array 210. The secure read module can be configured to execute a secure read operation, e.g., in response to determining that a read command from the controller is authenticated and/or authenticating readout data from the memory array 210.

In some implementations, the memory device 200 includes one or more registers (or buffers) that can be coupled to one or more components in the memory device 200, e.g., the state machine 244, the sense amplifier 250, and/or the output buffer 254.

In some examples, the memory device 200 includes a configuration register 220, e.g., a read configuration register (RDCR), configured to store a command (e.g., from a controller) for checking whether a read operation executed in the memory device 200 passes or fails and/or store pass/fail data associated with the read operation (e.g., to be output to the controller). The configuration register 220 can be coupled to the state machine 244, the sense amplifier 250, and/or the output buffer 254. In some embodiments, the configuration register 220 can be configurable through a command input from the controller, e.g., through the memory interface 230 and the data register 232. In some embodiments, the configuration register 220 can be predefined in the memory array 210 or inside circuitry of the memory device 200, e.g., through the sense amplifier 250.

In some examples, the memory device 200 includes a read status register (RDSR) configured to store a read status command (e.g., from the controller) for checking a ready/busy status of the memory device 200 and/or store the read status data of the memory device 200 (e.g., to be output to the controller). In some examples, the memory device 200 includes a read security register (RDSCUR) configured to store a command (e.g., from the controller) for checking whether a write operation executed in the memory device 200 passes or fails and/or store pass/fail data associated with the write operation (e.g., to be output to the controller).

In some examples, the memory device 200 includes a packet-in (PKTI) register configured to store a request packet (or input packet), e.g., from the controller. The request packet can include information indicating an operation, e.g., a secure write operation, a secure read operation, a secure key generation or exchange, or a secure data access.

FIG. 3A illustrates an example of a request packet 300 for a secure operation, according to one or more embodiments of the present disclosure. The request packet 300 includes different types of information (e.g., command, address, and/or data) with corresponding length information. As shown in FIG. 3A, the request packet 300 includes a command call (PKTI), address (ADDR) with a fixed code specifying the PKTI command call, and DATA in sequence.

DATA includes count (e.g., length of DATA), packet, and CRC of the packet that are input in sequence. The CRC can be generated by the controller and put in the request packet 300.

The packet can include one or more of CMD code, option (OP), variables (e.g., variable 1, variable 2), InDATA (e.g., input data to be written), and InMAC (e.g., MAC of the input data), e.g., as illustrated in Table 1 below. The CMD code is used to specify a command for performing an operation in the memory device 200, e.g., as illustrated in Table 2 below. The option is used to specify information of the operation, e.g., length of data to be written. The variables can include address information, e.g., address for writing data or reading data. InDATA represents input data to be written, and InMAC represents MAC of the input data that can be generated by the controller. A request packet for a write operation includes InDATA and InMAC in the packet.

Table 1 shows an example of data in a request packet with corresponding descriptions as follows:

| | | Data of Request packet | |
|---|---|---|---|
| Category | Name | Length (Bytes) | Description |
| CMD Code | PGRD | 1 | 0x0C |
| Option | OP | 1 | OP[0], OP[4:2]: Reserved, Must be 0 OP[1] = 1, with OutMAC when access Configuration region |
| Variable 1 | ADDR | 1 | The address of data: A31~A24 |
| | | 1 | The address of data: A23~A16 |
| | | 1 | The address of data: A15~A8 |
| | | 1 | The address of data: A7~A0 |
| Variable 2 | RBC | 2 | Number of bytes to read |
| | SID | 1 | Reserved, Must be 0 |
| | | 1 | Low byte in SID (session ID), OP[1] = 1 and ADDR = Configuration region |

Table 2 shows an example of different types of CMD codes with corresponding descriptions as follows:

| Category | Code | CMD Name | Description |
|---|---|---|---|
| Key | 0x21 | KECDH | Key exchange with Elliptic-curve Diffie-Hellman (ECDH) algorithm |
| | 0x23 | SSGEN | Generate a secure session for a Root key |
| Read | 0x0C | PGRD | Read plaintext data from data memory or configuration memory |
| Write | 0x29 | PGWR | Write Configuration and Counter memory when the region is unlock |

-continued

| Category | Code | CMD Name | Description |
|---|---|---|---|
| Nonce | 0x10 | NGEN | Generates Nonce from the internal Random Number Generator or import |
| Advance | 0x18 | HSDA | High Secure Data Access |

In some examples, the memory device 200 includes a packet-out (PKTO) register configured to store packet-out command or an output packet (e.g., a read packet) from the memory device 200. The read packet can include status information of an operation (e.g., secure operation such as secure read operation) performed in the memory device 200. As discussed with further details below, the status information can be indicated (or showed) by at least one of error code, output MAC, or CRC in the read packet.

FIG. 3B illustrates an example of a read packet 330 for a secure read operation, according to one or more embodiments of the present disclosure. Similar to the request packet 300 of FIG. 3A, the read packet 330 includes different types of information (e.g., command, address, data) with corresponding length information in sequence.

As shown in FIG. 3B, the read packet 330 includes a command call (PKO), address (ADDR) with a fixed code specifying the PKO command call, Dummy, and DATA in sequence. Dummy represents a configurable idle period after outputting the PKO and ADDR before outputting DATA, while one or more pins for outputting the read packet 330 can be at a high impedance (High-Z) mode. DATA includes count (e.g., length of DATA), Error Code 332, OutDATA 334, OutMAC 336, and CRC 338 of DATA, which are output in sequence. That is, Error Code 332 is output before OutDATA 334, OutMAC 336 is output after OutDATA 334, and CRC 338 is output at the end. Note that a read packet for a secure read operation includes OutDATA and Out-MAC.

OutDATA represents data to be output (or readout data), and OutMAC represents MAC of the OutDATA. The MAC can be generated by the memory device 200 by a cryptographic algorithm. The cryptographic algorithm can include an Advanced Encryption Standard (AES) algorithm that can be AES-GCM (Galois/Counter Mode) or AES-CCM (Counter with Cipher Block Chaining-Message Authentication Code). The MAC can include Galois Message Authentication Code (GMAC).

Error Code is used to report any error information associated with an operation (e.g., specified in the request packet or command from the controller) in the memory device 200. Different values of the error code can represent different types of error information.

Table 3 shows an example of Error Code with corresponding descriptions as follows:

| Name | Value | Description |
|---|---|---|
| Pass | 00h | Latest secure command was successful |
| CMDerr | 01h | Wrong CMDcode, wrong option, wrong variable and wrong length Wrong security profile or not supported |
| ADDRerr | 02h | Attempted to Write protected region while Write, address is illegal |
| BDRYerr | 04h | Crossed a page boundary or wrong byte count in specific mode |
| PERMerr | 08h | Permission violation. Attempted to access the zone in a mode not permitted by current configuration |
| NONCEerr | 10h | Nonce invalid |
| MACerr | 20h | Latest secure command crypto-processing was not successful |
| NVMCerr | 40h | GP_MC or UP_MC reached maximum (max) number |
| KEYerr | 80h | Key is unable to update, wrong Key ID, wrong Session ID (SID), Session already activated, Key generation or other key errors |
| LKDerr | A0h | Wrong configuration setting or configuration has not been locked down if required |

-continued

| Name | Value | Description |
|---|---|---|
| VFYerr | C0h | Data was failed at internal verification. Security critical parameters protect (CRC, SHA256) error |
| VMCerr | B0h | Session max number of transaction reached (e.g., CTE_MAX_DPA) |
| SMNerr | D0h | Session max number reached |
| KATerr | E0h | KAT test error |
| RULCerr | 11h | Rule check error |
| ECCerr | 22h | Data zone ECC uncorrectable |
| CECCerr | 33h | Configuration ECC (CECC) uncorrectable |
| CRCerr | 44h | CRC check error |
| RNGerr | 55h | Random Number Generator (RNG) health testing error |
| CIPHerr | FFh | Pass, ADDRerr, BDYerr, PERMerr or ECCerr in Host Sideband Bus Data (HSDA) command |

Each read packet includes a specific value representing a corresponding type of error. For example, if the latest secure command for a secure operation is successfully executed in the memory device 200, the error code is assigned with a value "00h" representing "pass". The memory array 210 can include a number of data zones. If a data zone, that is in a mode not permitted to access, is accessed, the error code is assigned with a value "08h" representing "PERMerr". In a read operation for reading data from one or more data zones, if data in at least one of the one or more data zones cannot be corrected by ECC code, the error code is assigned with a value "22h" representing "ECCerr".

In some implementations, if the value of the error code in the read packet is not "00h", it means that the latest secure command for a secure operation is not executed successfully for at least one of the errors shown in Table 3, and no OutDATA and OutMAC is output following the error code in the read packet. If the value of the error code is "00h" representing "pass", it means that the latest secure command for a secure operation is executed successfully at least before the error code in the read packet is output or concurrent with outputting the error code. For example, a first portion 334a of the OutDATA 334 (or readout data 334) (e.g., as illustrated in FIG. 3B) is output concurrently with the error code 332. If the ECC on the first portion 334a of the readout data 334 passes or succeeds, the value of the error code 332 is "00h" representing "pass". If the ECC on the first portion 334a of the readout data 334 fails, the value of the error code 332 is "22h" representing "ECCerr", and outputting the readout data 334 can be ceased.

However, after the error code 332 "00h" representing "pass", together with the first portion 334a of readout data 334, is output, the ECC on a second portion 334b of the readout data (e.g., as illustrated in FIG. 3B) that follows the first portion 334a may fail. Thus, the error code 332 "00h" in the read packet cannot accurately report the error occurrence (e.g., ECCerr) on the second portion 334b of the readout data 334. Accordingly, the controller receiving the read packet cannot detect the error occurrence on the second portion 334b of the readout data, which can affect a performance of the memory device 200 or a system (e.g., 100 of FIG. 1A or 150 of FIG. 1B) including the memory device 200 and the controller.

Implementations of the present disclosure provide techniques for accurately reporting error information in a read packet output as a result of executing a read operation (e.g., a secure read operation) in a memory device (e.g., the memory device 200 of FIG. 2), as described with further details below.

In some implementations, the memory device 200 is configured to change at least one of an original MAC of the readout data internally or an original CRC of the read packet internally to indicate error occurrence on the readout data, e.g., in response to determining that the ECC on a portion of the readout data (e.g., the second portion 334b) fails. As the OutMAC 336 and CRC 338 are output after the OutDATA 334, the changed MAC and/or the changed CRC can be generated by the memory device 200 and be used to accurately report the error information associated with the readout data 334. The controller and the memory device 200 can communicate according to a protocol, such that the controller can detect error information based on the changed MAC and/or the changed CRC in the read packet.

Figures 4A, 4B:
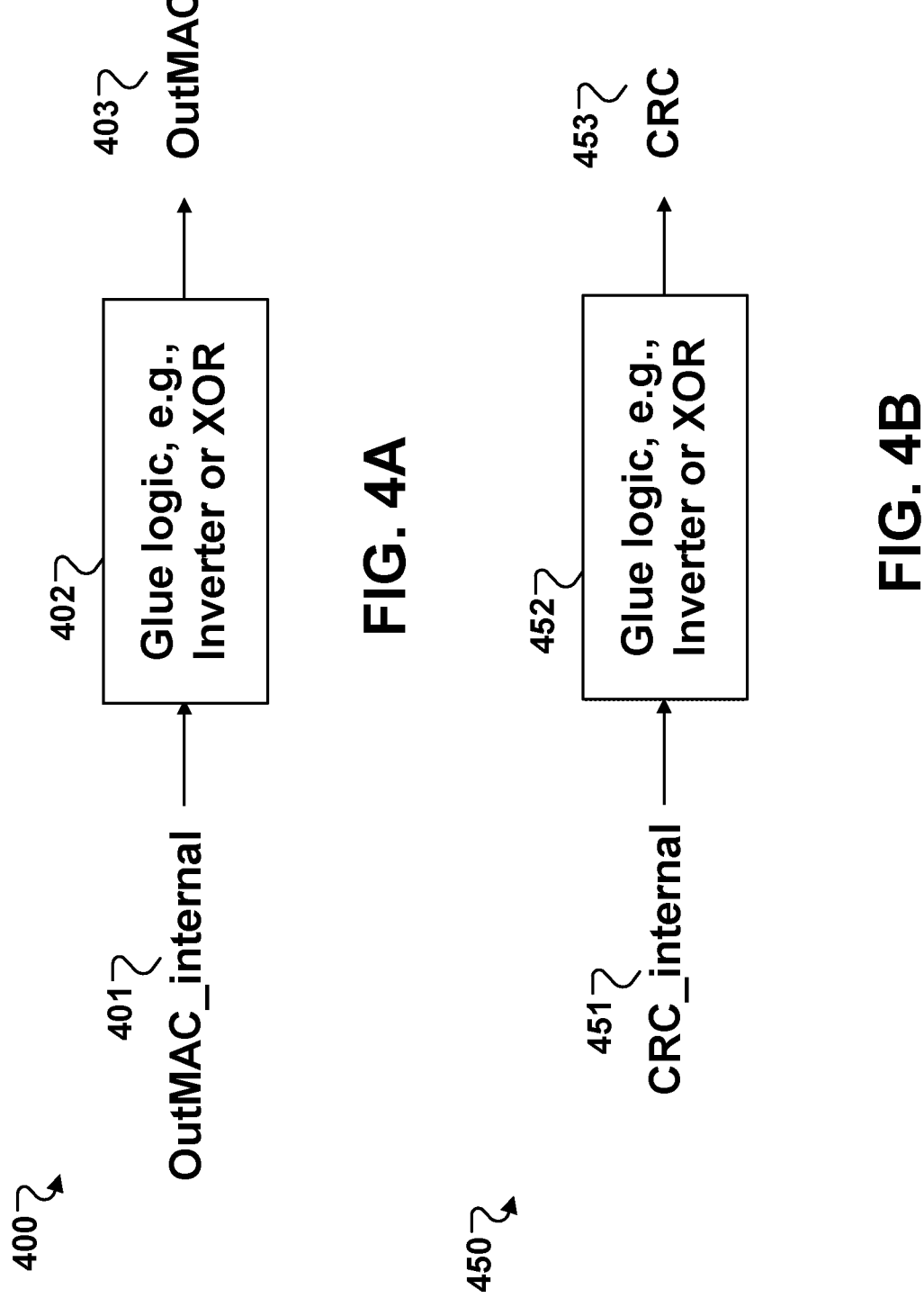
FIG. 4A illustrates an example of changing a message authentication code (MAC), according to one or more embodiments of the present disclosure.
FIG. 4B illustrates an example of changing a cyclic redundancy check (CRC), according to one or more embodiments of the present disclosure.

FIG. 4A illustrates an example 400 of changing a message authentication code (MAC), according to one or more embodiments of the present disclosure. As noted above, the memory device 200 can generate an original MAC of the readout data, e.g., OutMAC_internal 401, using the secure engine 260 (e.g., based on a cryptographic algorithm and a cryptographic key). The memory device 200 can include a logic 402 (e.g., a glue logic) configured to change the original MAC, OutMAC_internal 401, to be different from the original MAC. The changed MAC, e.g., OutMAC 403, can be output as OutMAC 336 in the read packet. In some examples, the logic 402 is configured to be an inverter or an XOR logic gate, which can invert the original MAC.

According to the protocol, after receiving the read packet from the memory device 200, the controller can generate MAC of the readout data 334 received in the read packet using the same cryptographic algorithm and same or corresponding cryptographic key). The controller can be configured to compare the generated MAC with the OutMAC 336 received in the read packet to determine whether the generated MAC is different from the OutMAC 336 received in the read packet. If the generated MAC is different from the OutMAC 336 received in the read packet, the controller can determine that there is an error associated with the readout data 334 received in the read packet. If the generated MAC is same as the OutMAC 336 received in the read packet, it indicates that the memory device 200 does not change the original MAC. The controller may determine that there is no error occurrence on the readout data 334 or continue to check the CRC received in the read packet. Note that the controller may determine whether the OutMAC 336 received in the read packet indicates error information by any other suitable manner.

FIG. 4B illustrates an example 450 of changing a cyclic redundancy check (CRC), according to one or more embodiments of the present disclosure. As noted above, the memory device 200 can generate an original CRC of the read packet e.g., CRC_internal 451, using the secure engine 260 (e.g., based on a CRC calculation or algorithm). The memory device 200 can include a logic 452 (e.g., a glue logic) configured to change the original CRC, CRC_internal 451, to be different from the original CRC. The changed CRC, e.g., CRC 453, can be output as CRC 338 in the read packet. In some examples, the logic 452 is configured to be an inverter or an XOR logic gate, which can invert the original CRC. In some examples, the logic 452 can be same as the logic 402.

According to the protocol, after receiving the read packet from the memory device 200, the controller can generate CRC 338 received in the read packet using a same CRC calculation or algorithm as the memory device 200. The controller can be configured to compare the generated CRC with the CRC 338 received in the read packet to determine whether the generated CRC is different from the CRC 338 received in the read packet. If the generated CRC is different from the CRC 338 received in the read packet, the controller can determine that there is an error associated with the readout data received in the read packet. If the generated CRC is same as the CRC 338 received in the read packet, it indicates that the memory device 200 does not change the original CRC. If the controller determines that the generated MAC is same as the OutMAC 336 and the generated CRC is same as the CRC 338 received in the read packet, the controller can determine that there is no error in the readout data 334 received in the read packet. Note that the controller may determine whether the CRC 338 received in the read packet indicates error information by any other suitable manner.

In some implementations, the memory device 200 can accurately report error occurrence on readout data by outputting error code after the readout data. For example, FIG. 3C illustrates another example of a read packet 350 for a secure operation, according to one or more embodiments of the present disclosure.

As illustrated in FIG. 3C, the read packet 350 includes OutDATA 352, OutMAC 354, Error Code 356, and CRC 358 that are arranged in order and output in sequence. If there is any error occurrence on the OutDATA 352, e.g., by detecting there is an ECC failure on the OutDATA 352, the memory device 200 can set a value (e.g., 22h) for the Error Code 356 to indicate the error. Thus, the controller can detect whether there is any error associated with the Out-DATA 352 based on the Error Code 356 received in the read packet 350.

OutMAC 354 can be an original MAC of the OutDATA 352 generated by the memory device 200 and be output following the OutDATA 352 in the read packet 350. In some implementations, CRC 358 is an original CRC of the read packet 350 generated by the memory device 200. In some implementations, if the memory device 200 detects error occurrence on the OutDATA 352, besides setting a specified value for the Error Code 356, the memory device 200 can also change the original CRC, as noted above (e.g., as illustrated in FIG. 4B), to be different from the original CRC. The controller can detect the error information associated with the OutDATA 352 based on the CRC 358 received in the read packet, as discussed above.

FIG. 5 is a flow chart of an example of a process 500 for managing status output in a semiconductor device, according to one or more embodiments of the present disclosure. The process 500 can be performed by the semiconductor device, e.g., the memory 116 of FIG. 1A, the memory device 170 of FIG. 1B, or the memory device 200 of FIG. 2. The semiconductor device can be a non-volatile memory device, such as a NOR flash memory device. The semiconductor device can be configured to perform a read operation (e.g., a secure read operation) with error detection and correction using error correction code (ECC).

The semiconductor device can include a memory array (e.g., the memory array 210 of FIG. 2) and a circuitry coupled to the memory array. The circuitry can include one or more components in the memory device 200 of FIG. 2, e.g., secure engine 260, memory interface 230, data register 232, SRAM buffer 234, address generator 236, X-decoder 238, mode logic 242, state machine 244, HV generator 246, Y-decoder 248, sense amplifier 250, and/or output buffer 254. The circuitry can also include one or more registers, e.g., configuration register 220, a read status register (RDSR), a read security register (RDSCUR), a packet-in (PKTI) register, and/or a packet-out (PKTO) register. The circuitry can include an ECC module configured to perform error detection and correction on data in the memory array. The circuitry can also include one or more logic circuits, e.g., the logic 402 configured to invert MAC and/or the logic 452 configured to invert CRC.

A controller can be coupled to the semiconductor device. The controller can be the host controller 122 or the device controller 112 of FIG. 1A or the controller 160 of FIG. 1B, or the controller as described with respect to FIGS. 2 to 4B. The semiconductor device and the controller can communicate with each other according to a protocol. The protocol can include Serial Peripheral Interface (SPI) or OPI. The controller can include a secure engine corresponding to the secure engine in the circuitry of the semiconductor device.

At 502, the circuitry executes a read operation in the memory array storing data. The read operation can be a secure read operation with error detection and correction using error correction code (ECC). The circuitry can execute the read operation based on a request packet, e.g., the request packet 300 of FIG. 3A and Table 1. The request packet can include information specifying the read operation, e.g., using CMD code "PGRD" shown in FIG. 3A and Table 2. The request packet can be received by the semiconductor device from the controller and stored in a PKTI register in the circuitry.

At 504, the circuitry outputs a read packet based on a result of the execution of the read operation. The read packet can be the read packet 330 of FIG. 3B or the read packet 350 of FIG. 3C. The read packet can include readout data (e.g., OutDATA 334 of FIG. 3B or OutDATA 352 of FIG. 3C) and error information associated with the readout data, and the error information can be indicated by at least one of an error code (e.g., Error Code 356 of FIG. 3C) or one or more secure codes (e.g., OutMAC 336 and/or CRC 338 of FIG. 3B or CRC 358 of FIG. 3C) in the read packet. The error information can indicate whether there is error occurrence on the readout data.

In some implementations, the circuitry is configured to sequentially output the error code, the readout data, and the one or more secure codes in the read packet, e.g., as illustrated in FIG. 3B. As the error code is output before the readout data, the error code (e.g., the Error Code 332 of FIG. 3B) indicates that there is no error associated with the readout data, and the one or more secure codes (e.g., OutMAC 336 and/or CRC 338 of FIG. 3B) indicate that there is an error associated with the readout data.

In some implementations, the one or more secure codes comprise at least one of a secure data code based on the readout data (e.g., OutMAC 336 of FIG. 3B) or a secure packet code based on the read packet (e.g., CRC 338 of FIG. 3B).

In some implementations, the circuitry is configured to: generate a message authentication code (MAC) of the readout data and change the MAC to obtain the secure data code that is different from the MAC. The circuitry can generate the MAC of the readout data by a cryptographic algorithm, and the cryptographic algorithm can include an Advanced Encryption Standard (AES) algorithm including AES-GCM (Galois/Counter Mode) or AES-CCM (Counter with Cipher Block Chaining-Message Authentication Code). The MAC can include Galois Message Authentication Code (GMAC). In some implementations, the circuitry can change the MAC to obtain the secure data code by inverting the MAC with a logic (e.g., the logic 402 of FIG. 4A). The logic can include at least one of an inverter or a XOR logic gate.

In some implementations, the circuitry is configured to: generate a cyclic redundancy check (CRC) of the read packet and change the CRC to obtain the secure packet code that is different from the CRC. The circuitry can change the CRC to obtain the secure packet code by inverting the CRC with a logic (e.g., the logic 452 of FIG. 4B), and the logic can include at least one of an inverter or a XOR logic gate. The circuitry can generate the CRC of the read packet by a CRC calculation or algorithm (e.g., CRC-16 polynomial).

In some implementations, the circuitry is configured to output the error information after the readout data, e.g., as illustrated in FIG. 3C. The circuitry can sequentially output the readout data, MAC of the readout data, the error code, and CRC of the read packet in the read packet, and the error information can be indicated by the error code.

In some cases, there is no indication of error information in the MAC and in the CRC. In some cases, the error information is further indicated by the CRC. The circuitry can generate an initial CRC of the read packet and change the initial CRC to obtain the CRC that is different from the initial CRC, e.g., as illustrated in FIG. 4B.

In some implementations, the circuitry is configured to generate the error information in response to detecting a failure of error correction on at least a portion of the readout data, e.g., a value of the Error code is "22h" as shown in Table 3. The readout data can include a first portion of the readout data output concurrently with the error code, e.g., the first portion 334a of OutDATA 334 of FIG. 3B, and a second portion of the readout data output after the error code, e.g., the second portion 334b of OutDATA 334 of FIG. 3B. The failure of error correction is on the second portion of the readout data.

In some implementations, the controller receives the read packet from the semiconductor device, and can detect the error information associated with the readout data based on the at least one of the error code or the one or more secure codes in the read packet.

In some implementations, the controller is configured to: receive the error code before the readout data and the one or more secure codes in the read packet (e.g., as shown in FIG. 3B) and detect the error information associated with the readout data based on the one or more secure codes in the read packet.

In some examples, the one or more secure codes include a secure data code (e.g., OutMAC 336 of FIG. 3B) based on the readout data. The controller is configured to: generate MAC of the readout data received in the read packet, compare the generated MAC with the secure data code received in the read packet to determine whether the generated MAC is different from the secure data code received in the read packet, and determine that there is an error associated with the readout data received in the read packet if the generated MAC is different from the secure data code received in the read packet.

In some examples, the one or more secure codes include a secure packet code (e.g., CRC 338 of FIG. 3B) based on the read packet. The controller is configured to: generate CRC of the read packet, compare the generated CRC with the secure packet code received in the read packet to determine whether the generated CRC is different from the secure packet code received in the read packet, and determine that there is an error associated with the readout data received in the read packet if the generated CRC is different from the secure packet code received in the read packet.

In some implementations, the controller is configured to receive the error code after the readout data (e.g., as shown in FIG. 3C), and detect the error information associated with the readout data based on the error code The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instruc- tions and one or more memory devices for storing instruc- tions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while opera- tions are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other imple- mentations can be made based on what is disclosed.

What is claimed is:

1. A semiconductor device comprising:
a memory array configured to store data; and
a circuitry coupled to the memory array and configured to execute a read operation in the memory array and output a read packet based on a result of the execution of the read operation in the memory array,
wherein the read operation is a secure read operation, and the read packet comprises an error code,
wherein the circuitry is configured to assign a value to the error code based on the result of the execution of the read operation in the memory array, different values of the error code indicating different types of errors asso- ciated with operations on the memory array, and
wherein the circuitry is configured to:
determine whether there is error occurrence on a first portion of the readout data;
in response to determining that there is error occurrence on the first portion of the readout data, assign a first value to the error code to indicate that there is error occurrence on the readout data, output the error code, without outputting the readout data,
in response to determining that there is no error occur- rence on the first portion of the readout data, assign a second value different from the first value to the error code to indicate that there is no error occur- rence on the first portion of the readout data, output the error code and the first portion of the readout data, and continue outputting a second portion of the readout data following the first portion of the readout data, and
in response to determining that there is error occurrence on the second portion of the readout data, configure at least one secure code to indicate that there is error occurrence on the readout data, and output the con- figured at least one secure code after the second portion of the readout data, wherein the at least one secure code comprises at least one of a message authentication code (MAC) of the readout data or a cyclic redundancy check (CRC) of the read packet.

2. The semiconductor device of claim 1, wherein the circuitry is configured to sequentially output the error code, the readout data, and one or more secure codes in the read packet, the one or more secure codes comprising the con- figured at least one secure code.

3. The semiconductor device of claim 2, wherein the error code indicates that there is no error associated with the readout data, and the configured at least one secure code indicates that there is an error associated with the readout data.

4. The semiconductor device of claim 1, wherein the circuitry is configured to:
generate the message authentication code (MAC) of the readout data; and
in response to determining that there is error occurrence on the second portion of the readout data, change the MAC to obtain a configured secure data code that is different from the MAC.

5. The semiconductor device of claim 4, wherein the circuitry is configured to change the MAC to obtain the configured secure data code by inverting the MAC with a logic, and
wherein the logic comprises at least one of an inverter or a XOR logic gate.

6. The semiconductor device of claim 1, wherein the circuitry is configured to:
generate the cyclic redundancy check (CRC) of the read packet; and
in response to determining that there is error occurrence on the second portion of the readout data, change the CRC to obtain a configured secure packet code that is different from the CRC.

7. The semiconductor device of claim 6, wherein the circuitry is configured to change the CRC to obtain the configured secure packet code by inverting the CRC with a logic, and
wherein the logic comprises at least one of an inverter or a XOR logic gate.

8. The semiconductor device of claim 1, wherein the circuitry is configured to output the error code after the readout data.

9. The semiconductor device of claim 8, wherein the circuitry is configured to sequentially output the readout data, MAC of the readout data, the error code, and CRC of the read packet in the read packet, and
wherein the error code indicates whether there is error occurrence on the readout data.

10. The semiconductor device of claim 9, wherein the CRC indicates whether there is error occurrence on the readout data.

11. The semiconductor device of claim 1, wherein the circuitry is configured to:

generate the error code in response to detecting a failure of error correction on the first portion of the readout data, and wherein the secure read operation is configured to perform error detection and correction using error correction code (ECC), and wherein the circuitry is configured to set the first value for the error code in response to determining that the ECC fails to correct the first portion of the readout data.

12. The semiconductor device of claim 1, wherein the circuitry is configured to:

execute the read operation based on a request packet, wherein the request packet comprises information specifying the read operation.

13. A system, comprising:

a semiconductor device comprising:

a memory array configured to store data; and a circuitry coupled to the memory array and configured to execute a read operation in the memory array and output a read packet based on a result of the execution of the read operation, wherein the read operation is a secure read operation, and the read packet comprises an error code, wherein the circuitry is configured to assign a value to the error code based on the result of the execution of the read operation in the memory array, different values of the error code indicating different types of errors associated with operations on the memory array, and wherein the circuitry is configured to:

determine whether there is error occurrence on a first portion of the readout data;

in response to determining that there is error occurrence on the first portion of the readout data, assign a first value to the error code to indicate that there is error occurrence on the readout data, output the error code, without outputting the readout data, in response to determining that there is no error occurrence on the first portion of the readout data, assign a second value different from the first value to the error code to indicate that there is no error occurrence on the first portion of the readout data, output the error code and the first portion of the readout data, and continue outputting a second portion of the readout data following the first portion of the readout data, and in response to determining that there is error occurrence on the second portion of the readout data, configure at least one secure code to indicate that there is error occurrence on the readout data, and output the configured at least one secure code after the second portion of the readout data, wherein the at least one secure code comprises at least one of a message authentication code (MAC) of the readout data or a cyclic redundancy check (CRC) of the read packet; and a controller coupled to the semiconductor device and configured to receive the read packet from the semiconductor device, wherein the controller is configured to detect whether there is error occurrence associated with the readout data based on the error code or the configured at least one secure code in the read packet.

14. The system of claim 13, wherein the controller is configured to:

receive the error code before the readout data and one or more secure codes in the read packet, the one or more secure codes comprising the configured at least one secure code; and detect whether there is error occurrence associated with the readout data based on the configured at least one secure code in the read packet.

15. The system of claim 14, wherein the one or more secure codes comprise a secure data code based on the readout data, and wherein the controller is configured to:

generate MAC of the readout data received in the read packet, compare the generated MAC with the secure data code received in the read packet to determine whether the generated MAC is different from the secure data code received in the read packet, and determine that there is an error associated with the readout data received in the read packet if the generated MAC is different from the secure data code received in the read packet.

16. The system of claim 14, wherein the one or more secure codes comprise a secure packet code based on the read packet, and wherein the controller is configured to:

generate CRC of the read packet, compare the generated CRC with the secure packet code received in the read packet to determine whether the generated CRC is different from the secure packet code received in the read packet, and determine that there is an error associated with the readout data received in the read packet if the generated CRC is different from the secure packet code received in the read packet.

17. The system of claim 13, wherein the controller is configured to:

receive the error code after the readout data, and detect whether there is error occurrence associated with the readout data based on the error code.

18. A method comprising:

executing a read operation in a memory array storing data;

generating a read packet based on a result of executing the read operation, wherein the read operation is a secure read operation, and the read packet comprises an error code, different values of the error code indicating different types of errors associated with operations on the memory array;

determining whether there is error occurrence on a first portion of the readout data;

in response to determining that there is error occurrence on the first portion of the readout data, assigning a first value to the error code to indicate that there is error occurrence on the readout data, and outputting the error code, without outputting the readout data; or in response to determining that there is no error occurrence on the first portion of the readout data, assigning a second value different from the first value to the error code to indicate that there is no error occurrence on the first portion of the readout data, outputting the error code and the first portion of the readout data, and continuing outputting a second portion of the readout data following the first portion of the readout data in the read packet; and in response to determining that there is error occurrence on the second portion of the readout data, configuring at least one secure code to indicate that there is error occurrence on the readout data, and outputting the configured at least one secure code in the read packet after the second portion of the readout data, wherein the at least one secure code comprises at least one of a message authentication code (MAC) of the readout data or a cyclic redundancy check (CRC) of the read packet.

\* \* \* \* \*